US011229870B2

(12) United States Patent
Yun et al.

(10) Patent No.: US 11,229,870 B2
(45) Date of Patent: Jan. 25, 2022

(54) ROBOT PURIFIER CAPABLE OF ROTATING VERTICALLY AND HORIZONTALLY

(71) Applicant: Coway Co., Ltd., Chungcheongnam-do (KR)

(72) Inventors: Byung Soo Yun, Seoul (KR); Han Soo Kim, Seoul (KR); Jung Yeon Kim, Seoul (KR); Tae Kyung Kang, Seoul (KR); Dong Hui Kim, Seoul (KR); Sang Woo Kang, Seoul (KR)

(73) Assignee: COWAY CO., LTD., Chungcheongnam-do (KR)

( * ) Notice: Subject to any disclaimer, the term of this patent is extended or adjusted under 35 U.S.C. 154(b) by 442 days.

(21) Appl. No.: 16/475,890

(22) PCT Filed: Dec. 19, 2017

(86) PCT No.: PCT/KR2017/014998
§ 371 (c)(1),
(2) Date: Oct. 10, 2019

(87) PCT Pub. No.: WO2018/128301
PCT Pub. Date: Jul. 12, 2018

(65) Prior Publication Data
US 2020/0030736 A1 Jan. 30, 2020

(30) Foreign Application Priority Data
Jan. 3, 2017 (KR) .................. 10-2017-0000580

(51) Int. Cl.
*B01D 46/46* (2006.01)
*F24F 3/16* (2021.01)
(Continued)

(52) U.S. Cl.
CPC ......... *B01D 46/46* (2013.01); *B01D 46/0026* (2013.01); *B01D 46/0056* (2013.01);
(Continued)

(58) Field of Classification Search
CPC ........ B01D 46/46; B01D 46/0056; F24F 3/16
See application file for complete search history.

(56) References Cited

U.S. PATENT DOCUMENTS 6,459,955 B1  10/2002  Bartsch et al.
9,392,920 B2   7/2016  Halloran et al.
(Continued)

FOREIGN PATENT DOCUMENTS

CN   101105307 A    1/2008
CN   101306283 A   11/2008
(Continued)

OTHER PUBLICATIONS

EESR issued by EPO dated Sep. 22, 2020.
International Search Report PCT/KR2017/014998, dated Apr. 16, 2018, 4 Pages.

*Primary Examiner* — Robert A Hopkins
(74) *Attorney, Agent, or Firm* — Brooks Kushman P.C.

(57) ABSTRACT

A robot purifier including: a purifying part which draws, purifies, and discharges air; and a driving part which is located at a lower end of the purifying part and is capable of autonomous driving, wherein the purifying part is capable of rotating 360 degrees horizontally, and the purifying part also is capable of rotating vertically such that an air intake direction and an air discharge direction in the vertical and horizontal directions is controllable.

12 Claims, 4 Drawing Sheets

(51) Int. Cl.
  *F24F 11/79* (2018.01)
  *B01D 46/00* (2006.01)
  *B01D 46/10* (2006.01)
  *F24F 11/00* (2018.01)
  *F24F 13/20* (2006.01)

(52) U.S. Cl.
  CPC .............. *B01D 46/103* (2013.01); *F24F 3/16* (2013.01); *F24F 11/00* (2013.01); *F24F 11/79* (2018.01); *F24F 13/20* (2013.01); *B01D 2279/50* (2013.01)

(56) References Cited

U.S. PATENT DOCUMENTS

| | | |
|---|---|---|
| 2005/0279059 A1 | 12/2005 | Lee et al. |
| 2006/0059872 A1 | 3/2006 | Lee et al. |
| 2011/0271839 A1 | 11/2011 | Kim et al. |
| 2016/0278593 A1 | 9/2016 | Lee et al. |

FOREIGN PATENT DOCUMENTS

| | | | |
|---|---|---|---|
| CN | 201513983 U | | 6/2010 |
| CN | 102221249 A | | 10/2011 |
| CN | 104937359 A | | 9/2015 |
| CN | 105299862 A | | 2/2016 |
| CN | 105972705 A | | 9/2016 |
| CN | 205747250 U | * | 11/2016 |
| CN | 109955260 A | * | 7/2019 |
| JP | 2005111432 A | | 4/2005 |
| JP | 5997857 B1 | | 9/2016 |
| KR | 100252653 B1 | | 4/2000 |
| KR | 200333880 Y1 | | 11/2003 |
| KR | 1020080013392 A | | 2/2008 |
| KR | 1020140096971 A | | 8/2014 |
| KR | 1020160012796 A | | 2/2016 |
| WO | 2008018678 A2 | | 2/2008 |

* cited by examiner

ROBOT PURIFIER CAPABLE OF ROTATING VERTICALLY AND HORIZONTALLY

CROSS-REFERENCE TO RELATED APPLICATION

This application is the U.S. national phase of PCT Application No. PCT/KR2017/014998 filed on Dec. 19, 2017, which claims priority to KR Patent Application No. 10-2017-0000580 filed on Jan. 3, 2017, the disclosures of which are incorporated in their entirety by reference herein.

TECHNICAL FIELD

The present invention relates to a robot purifier, a purifying part of which may rotate vertically and horizontally.

BACKGROUND ART

Robot purifiers, which perform the function of cleaning with robots capable of autonomous driving, are widely used. Further, robot purifiers, which perform the function of purifying air with robots capable of autonomous driving, also have been continuously developed since Korean Utility Model No. 20-0333880.

Unlike a robot cleaner, a robot purifier travels to one point of a unit space (for example, a room, a kitchen, or a living room in a general home) and cleans air if it is determined that purification of air in the corresponding space is necessary, instead of having to travel on the entire floor surface of a use space.

A technology of converting the direction, in which air purified by an air purifier is discharged, is a known technology.

However, an air purifier is fixedly installed at one site, and there hardly is a need to convert the direction, in which the air is discharged, in an aspect that the air is discharged mainly upward for circulation of the air in the entire space.

In contrast, because the robot purifier has to clean the air while moving, it is preferable that the direction of an air intake hole is adjusted as the robot purifier may move to a space, in which the quality of air deteriorates, and may be used to intensively draw the air of a poor quality.

Further, according to users, the purified air is intended to be intensively discharged toward the user or the purified air is intended to be discharged upwards and circulate in the entire unit space. Accordingly, adjustment of the direction of the air discharge hole is also a function which is required by the robot purifiers.

(Patent Document 1) KR 20-03337880 Y1
(Patent document 2) U.S. Pat. No. 9,392,920
(Patent document 3) JP 2005-111432

DISCLOSURE

Technical Problem

The present invention is adapted to solve the problems.

In detail, the present invention provides a robot purifier which can rotate the directions of an air intake hole and an air discharge hole upwards, downwards, leftwards, and rightwards.

Technical Solution

In accordance with an aspect of the present invention, there is provided a robot purifier including: a purifying part (100) which draws, purifies, and discharges air; and a driving part (200) which is located at a lower end of the purifying part (100) and is capable of autonomous driving, wherein the purifying part (100) is capable of rotating 360 degrees horizontally.

It is preferable that the driving part 200 includes: a body (210); a ball bearing (221) which is fixed to the body (210); and a gear (222) which is fixed on the ball bearing (221) to be rotatable and includes gear teeth, and a lower cover (112) is located at an outer lower end of the purifying part (100), a window lower cover (114) is located at a portion of the center of the lower cover (112), which is connected to the driving part (200), and a gear head (113) is located on one side of the window lower cover (114), and wherein an outside of the gear head (113) is engaged with an inside of the gear (222).

It is preferable that the gear teeth of the gear (222) are engaged with a gear of a power member of the driving part (200).

It is preferable that the center of the gear (222) and the center of the gear head (113) are opened, a connector (225) is provided to pass through the center of the gear (222) and the center of the gear head (113), which are opened, and the purifying part (100) and the driving part (200) are connected to each other by the connector (225) to rotate leftwards and rightwards.

It is preferable that a cable is provided to pass through the center of the gear (222) and the center of the gear head (113), which are opened, and electric power and an electrical signal are transmitted from the driving part (200) and are received by the purifying part (100) through the cable.

It is preferable that the purifying part (100) is capable of rotating 360 degrees horizontally and is capable of rotating vertically.

It is preferable that an air discharge hole is located in the purifying part (100), and a direction, in which the air is discharged through the air discharge hole, is changed to an upward direction or a downward direction when the purifying part (100) rotates vertically.

It is preferable that, a lower cover (112) is located at an outer lower end of the purifying part (100), and a window lower cover (114) is located at a portion of the center of the lower cover (112), which is connected to the driving part (200), the purifying part (100) further includes: a guide fan assembly (120) which draws the air inwards and is coupled to the lower cover (112), the guide fan assembly (120) includes a guide fan (122), an arc-shaped upward/downward motion gear is located in any one of the window lower cover (114) and the guide fan (122), and that the upward/downward motion gear is engaged with the pinion gear such that the purifying part (100) is capable of rotating vertically.

It is preferable that the lower cover (112) has a semi-spherical shape.

It is preferable that the air discharge hole is located on a front surface of the purifying part (100), and air intake holes are located on a left surface or a right surface, or both of the left surface and the right surface of the purifying part (100), and the air intake holes are cover filters (124) which are provided in the guide fan assembly (120), the air discharge hole is a discharge grill (129) which is provided in the guide fan assembly (120), and the discharge grill (129) is located on the front surface of the purifying part (100).

In accordance with an aspect of the present invention, there is provided an robot purifier including: a purifying part (100) which draws, purifies, and discharges air; and a driving part (200) which is located at a lower end of the purifying part (100) and is capable of autonomous driving, wherein the purifying part (100) is capable of rotating 360 degrees horizontally, is capable of rotating vertically, and an air intake direction and an air discharge direction in the vertical and horizontal directions is controllable.

Advantageous Effects

According to the present invention, the purifying part can freely rotate upwards, downwards, leftwards, and rightwards, and thus, the directions of the air intake hole and the air discharge hole can be adjusted.

Accordingly, various schemes, such as a scheme of intensively drawing air at a part, in which the quality of air deteriorates, a scheme of directly discharging purified air to the user, and a scheme of discharging purified air upwards to circulate air in the entire unit space, can be freely set to be used.

DESCRIPTION OF THE INVENTION

BEST MODE

Figure 1:
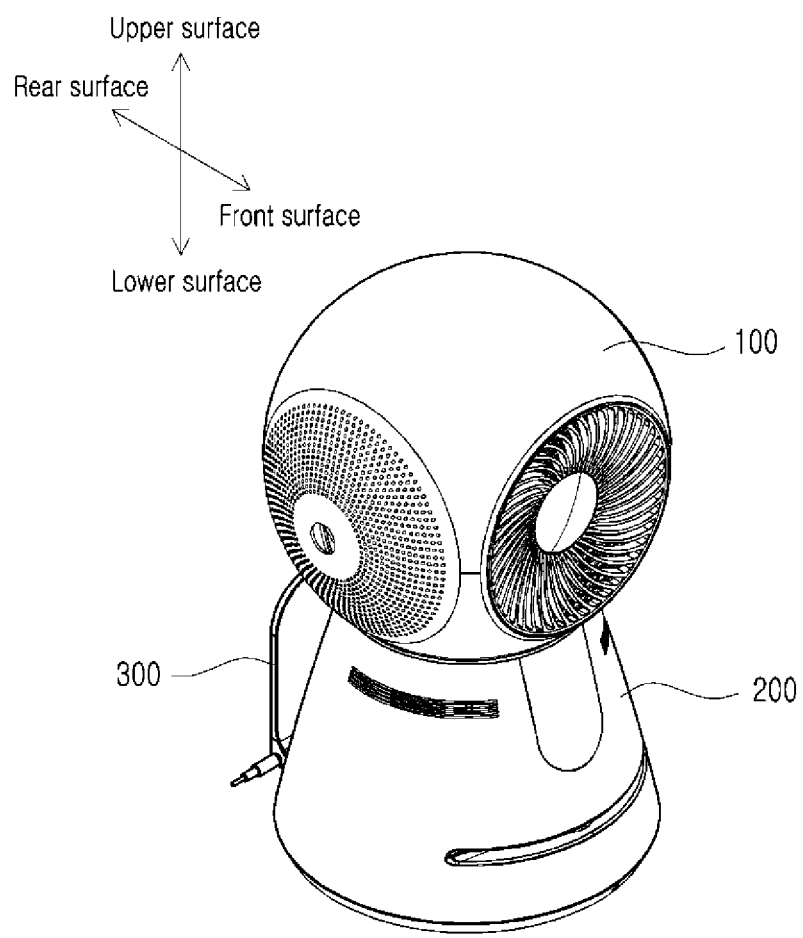
FIG. 1 is a perspective view viewed from the front top side of a robot purifier according to the present invention.
Figure 2:
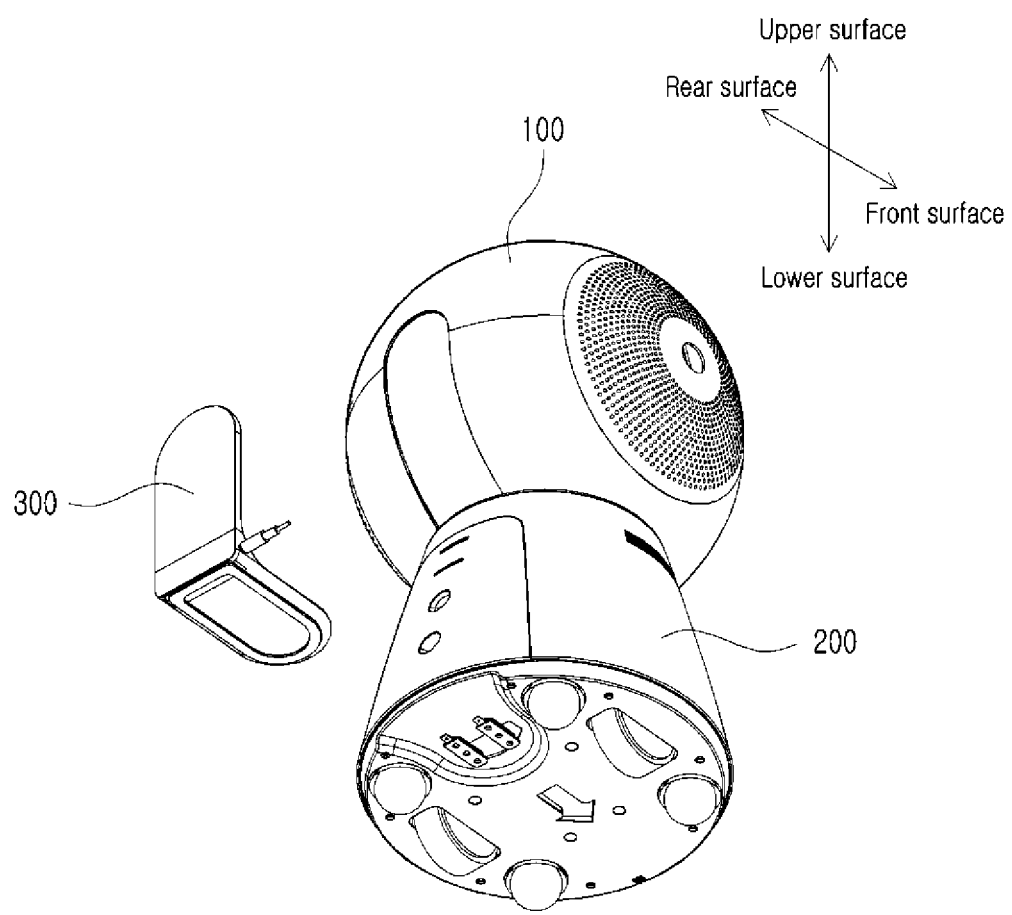
FIG. 2 is a perspective view viewed from the rear bottom side of the robot purifier.
Figure 3:
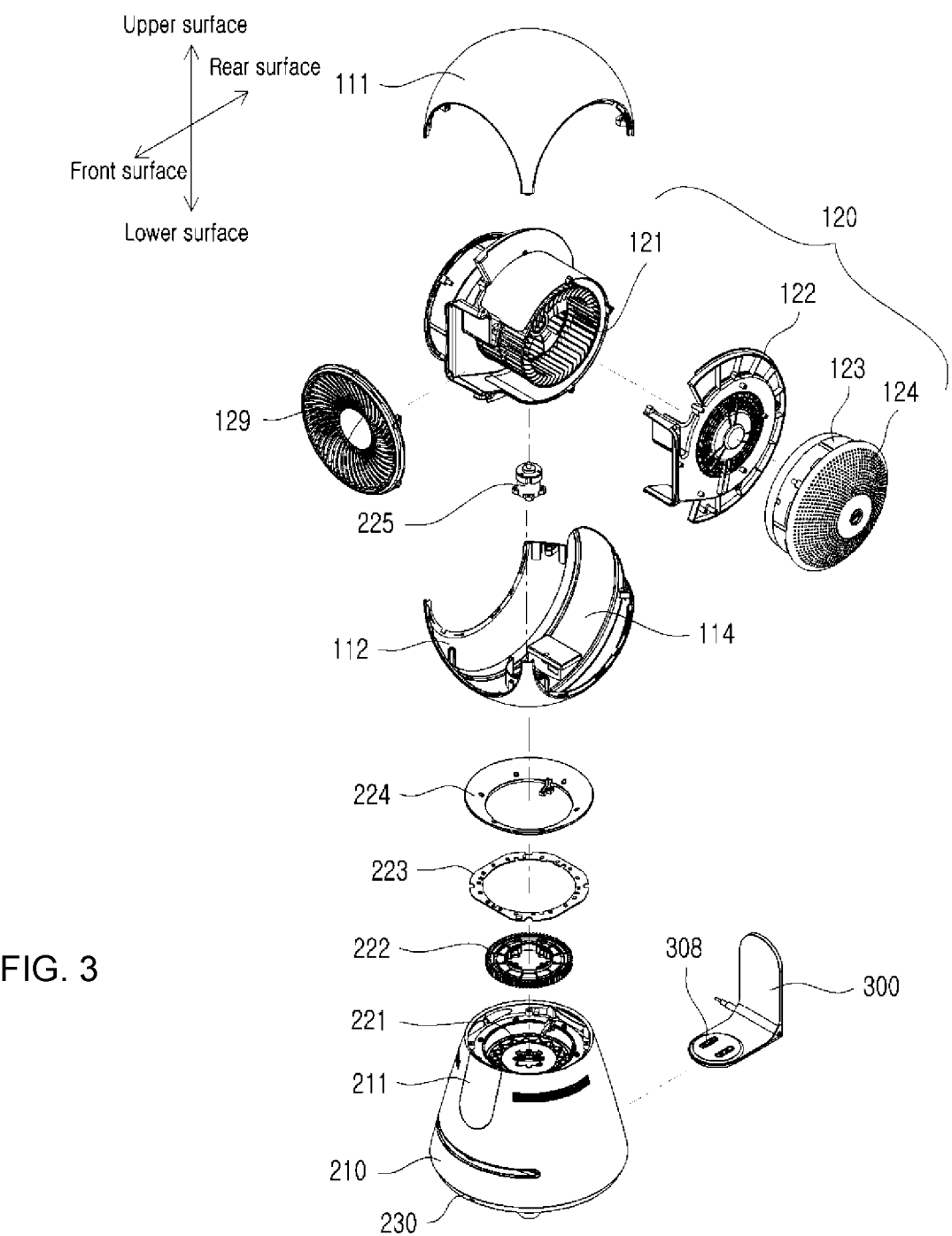
FIG. 3 is an exploded perspective view viewed from the front top side of the robot purifier according to the present invention.
Figure 4:
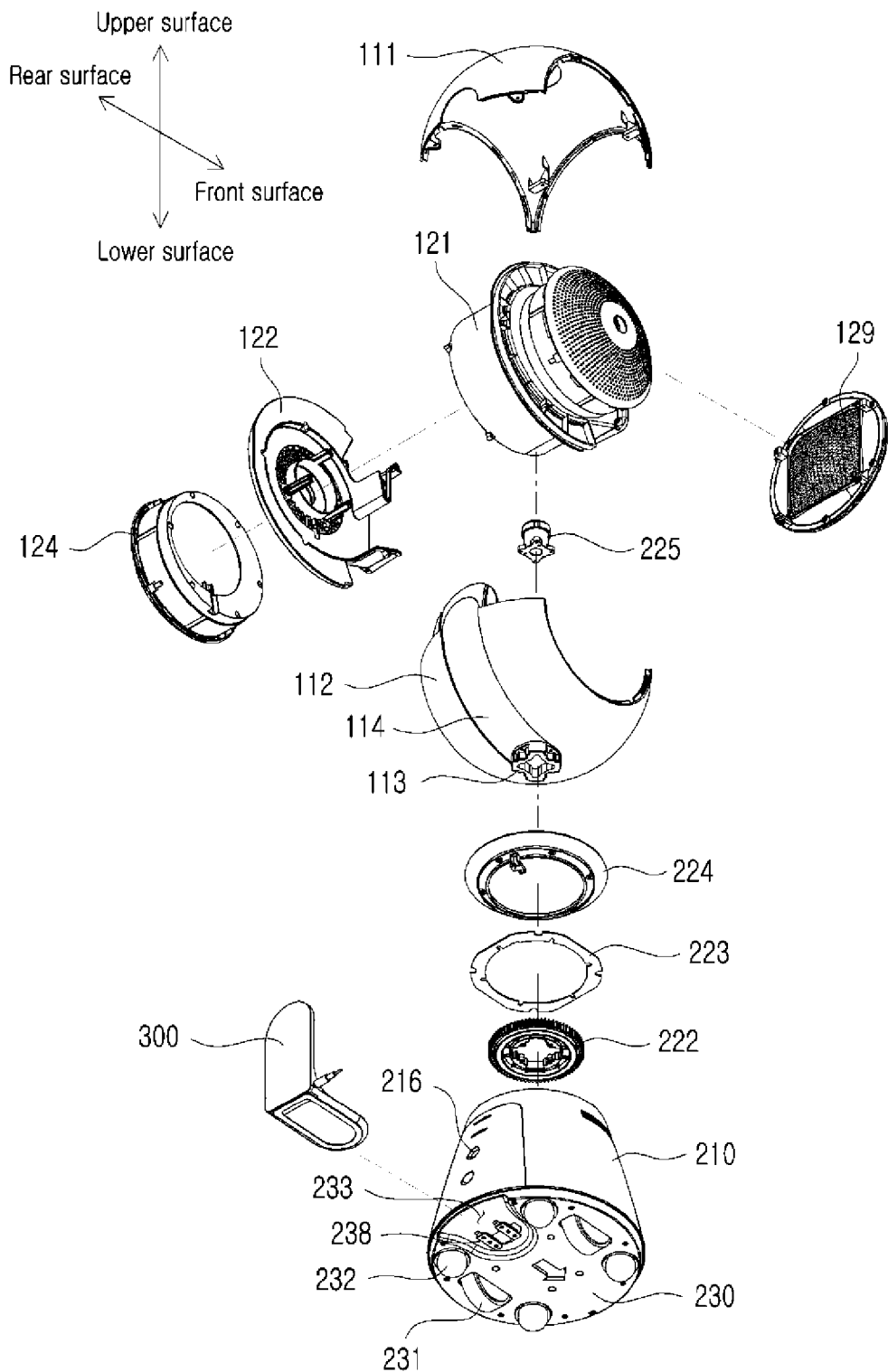
FIG. 4 is an exploded perspective view viewed from the rear bottom side of the robot purifier.

There is a main façade, from which air filtered by a robot purifier is discharged, and the main façade will be referred to as 'a front surface' hereinafter. Referring to FIGS. 2 and 4, an arrow is shown in a base part and the direction indicated by the arrow is a front surface. An opposite direction to the front surface will be referred to as 'a rear surface'. FIGS. 1 to 4 illustrate the directions of an upper surface and a lower surface as well as the front surface and the rear surface.

Further, a movement of the robot purifier to a direction, in which 'the front surface' moves, will be referred to as a forward movement, and a movement of the robot purifier to an opposite direction will be referred to as a rearward movement.

Further, 'a leftward/rightward rotation' means a rotation of the robot purifier to a horizontal direction in which the front surface and the rear surface are connected to each other, and 'an upward/downward rotation' means a rotation of the robot purifier to a vertical direction in which the upper surface and the lower surface are connected to each other.

Description of Robot Purifier

The robot purifier according to the present invention will be described in detail with reference to FIGS. 1 to 4. FIGS. 3 and 4 illustrate exploded views, but some components, such as a power member, a battery, a substrate, and cables, which are embedded are omitted for description.

The robot purifier according to the present invention comprises a purifying part 100, a driving part 200, and a docking part 300.

The purifying part 100 functions to draw, filter, and discharge air.

The main components of the purifying part 100 are protected by an upper cover 111 and a lower cover 112 and are mounted in an inner space.

In the drawings, it is illustrated that the purifying part 100 has a spherical shape, and in this case, the upper cover 111 and the lower cover 112 have semispherical shapes. As will be described below, it is noted that only the lower cover 112 may have a semispherical shape for rotation of the purifying part 100, and the shape of the upper cover 111 may have any other shape.

A window lower cover 114 is located at a portion of the center of the lower cover 112, which is coupled to the driving part 200, and a gear head 113 is located on one side of the window lower cover 114 to be integral with or separate from the lower cover 114.

An outer convexo-concave portion of the gear head 113 is connected to an inner convexo-concave portion of a gear 222. Accordingly, during rotation of the gear 222, the purifying part 100 may rotate leftwards and rightwards. Although the drawings illustrate connection by the convexo-concave portions, but any other connection, such as a screw scheme, may be possible.

Further, a connector 225 passes through the gear head 113 and supplies power to an inside of the purifying part 100.

A guide fan assembly 120 is a component which purifies air.

A fan 121 of the guide fan assembly 120 receives power from a power member (not illustrated) and rotates, draws air from opposite side surfaces thereof and filters the air, and discharges the filtered air through a discharge grill 129.

That is, the discharge grill 129 functions as an air discharge hole.

In the illustrated drawings, a portion, at which the discharge grill 129 is located, constitutes the front surface of the robot purifier. That is, the filtered air is discharged on the front surface of robot purifier according to the present invention. Of course, the discharge grill 129, which is an air discharge hole, may be located on the upper surface or the rear surface, instead of the front surface.

Portions, at which the air is drawn, are left and right sides, and each of the portions include a guide fan 122, an air purifying filter 123, and a cover filter 124.

The cover filter 124 is a component which is exposed to the outside of the purifying part 100, and has a plurality of fine holes to primarily filter the drawn air and protect the air purifying filter 123. That is, the cover filter 124 functions as an air intake hole.

The air purifying filter 123 is a core component which filters the drawn air, and may include any filter known in the prior art. For example, a deodorization filter and HEPA filter may be included.

The guide fan 122 guides the air, which passed through the air purifying filter 123, to the inside.

Meanwhile, although it is illustrated in the drawings that the air discharge hole is located on the front surface and the cover filters 124, which are air intake holes, are located on both the left side and the right side, the cover filter 124 may be located on only one of the left side and the right side and the air may be drawn only through one side in another embodiment.

Further, it is apparent that when the air discharge hole is located on the upper surface or the rear surface, the location of the guide fan assembly 120 including the filter may be changed to the front surface, the rear surface, or the upper surface correspondingly.

The driving part 200 supports the purifying part 100, performs an autonomous driving function according to a condition, and is docked to the docking part 300 and receives electric power.

A body 210 is provided outside the driving part 200. The body 210 protects a battery, a substrate, a camera, a power member, and various sensors, which are embedded.

A display part 211 is located on a front surface of the body 210. The display part 211 outputs various pieces of information, such as a charging state, a filter state, and a use mode.

A camera 216 is located on a rear surface of the body 210.

A ball bearing 221, a gear 222, an LED substrate 223, and a substrate cover 224 are provided inside the driving part 200, and are connected to the purifying part 100 by the connector 225.

Through the ball bearing 221 and the gear 222, the purifying part 100 may rotate on the driving part 200.

The gear teeth of the gear 222 are connected to another gear (not illustrated) of the power member (not illustrated) inside the driving part 200 and thus may rotate. An inner convexoconcave portion of the gear 222 is connected to an outer convexo-concave portion of the gear head 113 and rotates the purifying part 100 leftwards and rightwards.

A plurality of LEDs are located radially on the LED substrate 223.

The substrate cover 224 is positioned on the LED substrate 223 and protects the LED substrate 223. A lead switch (not illustrated) is provided on one side of the substrate cover 224. A magnet is located in the gear 222, and a proper location thereof may be identified by using the lead switch (not illustrated). The proper location also may be identified by using a micro switch or an optical sensor.

The connector 225 is a portion which protrudes toward the purifying part 100 when the purifying part 100 and the driving part 200 are coupled to each other, and passes through the gear head 113. A slip ring wire (not illustrated) may be provided inside the connector 225 to prevent a cable connecting the driving part 200 and the purifying part 100 from being twisted even when the purifying part 100 rotates 360 degrees leftwards and rightwards or to prevent the cable from being twisted by setting repetition of a forward rotation and a reverse rotation, without using the slip ring wire.

In this way, the connector 225 connects the purifying part 100 and the driving part 200 and prevents separation or deviation of the purifying part 100 and the driving part 200 in the case of horizontal and vertical rotation, and thus the center of the purifying part 100 is maintained.

A base 130 is located on a lower surface of the driving put 100.

A main wheel 231 which moves the driving part 200 and an auxiliary wheel 232 which assists the main wheel 231 are provided in the base 230.

A separate direction conversion member (not illustrated) for converting the travel direction of the robot purifier may be further connected to any one of the main wheel 231 and the auxiliary wheel 232.

A docking recess 233, into which the docking part 300 may be inserted, is provided in the base 230, and a body connection terminal 238 is provided in the docking recess 233. A docking connection terminal 308 of the docking part 300 may be connected to the body connection terminal 238.

The docking recess 233 is formed to face the rear surface of the robot purifier.

The docking part 300 receives electric power from the outside in a wired way, and supplies electric power to the battery (not illustrated) in the driving part 200 through the docking connection terminal 308.

A sensor is provided in any one of the docking part 300 or the driving part 200, and an identifier may be provided in the other one. Through this, a distance between the docking part 300 and the robot purifier may be identified.

Description of Method for Rotating Robot Purifier Vertically and Horizontally

The robot purifier according to the present invention may allow the purifying part 100 on the upper side to rotate 360 degrees leftwards and rightwards (that is, in a horizontal direction) and may rotate upwards and downwards (that is, in a vertical direction) at a specific angle. The upward/downward specific angle may be about 45 degrees with respect to a reference angle illustrated in FIG. 1, but may be adjusted according to a coupling scheme of the purifying part 100 and the driving part 200 and the shape of the coupling recess.

In this way, it is preferable that the purifying part 100 has a spherical shape for a structure which may rotate vertically and horizontally. Of course, even when the front surface has a cylindrical shape which is circular or the upper surface has a cylindrical shape which is circular, the concept of the present invention may not be deviated.

As mentioned above, the driving part 200 includes a ball bearing 221 which is fixed to the body 210, and a gear 222 which is fixed to the ball bearing 221 to be rotatable and includes gear teeth and an inner convexo-concave portion.

The gear teeth of the gear 222 are engaged with a gear (not illustrated) of the power member (not illustrated) of the driving part 200, and the gear 222 is rotated by the power member.

The inner convexo-concave portion of the gear 222 is engaged with the outer convexo-concave portion of the gear head 113, which is located at a lower distal end of the window lower cover 112 at an outer lower end of the purifying part 100.

Accordingly, if the gear 222 is rotated by the power member of the driving part 200, the purifying part 100 rotates leftwards and rightwards.

Here, the center of the gear 222 and the center of the gear head 113 are opened, and cables, through which electric power and electrical signals pass, pass through the opened centers.

As illustrated in the drawings, the upward/downward rotation scheme will be described with the assumption that the purifying part 100 has a spherical shape.

Here, considering the rotation range, only the lower cover 112 of the purifying part 100 may have a semispherical shape. The upper cover 111 may have any shape, and for example, as illustrated in the drawings, the upper cover 111 may have a semispherical shape and the purifying part 100 may have a spherical shape but may have any shape, such as a cylindrical shape or a rectangular shape.

An arc-shaped upward/downward motion gear is located in any one of the lower cover 114 or the guide fan 122, and a pinion gear is located in the other.

That is, a scheme of locating an upward/downward motion gear may be located in the window lower cover 114 and locating a pinion gear in the guide fan 122 is also possible, and in contrast, a scheme of locating a pinion gear in the window lower cover 114 and locating an upward/downward motion gear in the guide fan 122 is also possible.

If power is supplied in a state in which the upward/downward motion gear and the pinion gear are engaged with each other, the guide fan 122 rotates upwards and downwards with respect to the lower cover 114 fixed by the connector 225 or the like, and accordingly, the guide fan assembly 120, the upper cover 111, and the lower cover 112 rotate upwards and downwards.

Although the embodiment of the present invention illustrated in the drawings has been described so that those skilled in the art can easily reproduce and implement the present invention, it is merely exemplary and it will be understood by those skilled in the art that various modifications and equivalent embodiments can be made. Therefore, the scope of the present invention should be determined according to the claims.

DESCRIPTION OF REFERENCE NUMERALS

100: Purifying part
111: Upper cover
112: Lower cover
113: Gear head
114: Window lower cover
120: Guide fan assembly
121: Fan
122: Guide fan
123: Air purifying filter
124: Cover filter
129: Discharge grill
200: Driving part
210: Body
211: Display part
216: Camera
221: Ball bearing
222: Gear
223: LED substrate
224: Substrate cover
225: Connector
230: Base
231: Main wheel
232: Auxiliary wheel
233: Docking recess
238: Body connection terminal
300: Docking part
308: Docking connection terminal

The invention claimed is:

1. A robot purifier comprising:
a purifying part which draws, purifies, and discharges air; and
a driving part which is located at a lower end of the purifying part and is capable of autonomous driving,
wherein the purifying part is capable of rotating horizontally.

2. The robot purifier of claim 1, wherein the driving part 200 comprises:
a body;
a ball bearing which is fixed to the body; and
a gear which is fixed on the ball bearing to be rotatable and includes gear teeth,
wherein a lower cover is located at an outer lower end of the purifying part, a window lower cover is located at a portion of the center of the lower cover, which is connected to the driving part, and a gear head is located on one side of the window lower cover, and
wherein an outside of the gear head is engaged with an inside of the gear.

3. The robot purifier of claim 2, wherein the gear teeth of the gear are engaged with a gear of a power member of the driving part.

4. The robot purifier of claim 3, wherein the center of the gear and the center of the gear head are opened,
wherein a connector is provided to pass through the center of the gear and the center of the gear head, which are opened, and
wherein the purifying part and the driving part are connected to each other by the connector to rotate leftwards and rightwards.

5. The robot purifier of claim 4, wherein a cable is provided to pass through the center of the gear and the center of the gear head, which are opened, and electric power and an electrical signal are transmitted from the driving part and are received by the purifying part through the cable.

6. The robot purifier of claim 1, wherein the purifying part is capable of rotating 360 degrees horizontally.

7. A robot purifier comprising:
a purifying part which draws, purifies, and discharges air; and
a driving part which is located at a lower end of the purifying part and is capable of autonomous driving,
wherein the purifying part is capable of rotating 360 degrees horizontally, is capable of rotating vertically, and an air suction direction and an air discharge direction in the vertical and horizontal directions is controllable.

8. The robot purifier of claim 6, wherein the purifying part is capable of rotating 360 degrees horizontally and is capable of rotating vertically.

9. The robot purifier of claim 6, wherein an air discharge hole is located in the purifying part, and
wherein a direction, in which the air is discharged through the air discharge hole, is changed to an upward direction or a downward direction when the purifying part rotates vertically.

10. The robot purifier of claim 7, wherein a lower cover is located at an outer lower end of the purifying part, and a window lower cover is located at a portion of the center of the lower cover, which is connected to the driving part,
wherein the purifying part further comprises: a guide fan assembly which suctions the air inwards and is coupled to the lower cover,
wherein the guide fan assembly comprises a guide fan,
wherein an arc-shaped upward/downward motion gear is located in any one of the window lower cover and the guide fan, and
wherein the upward/downward motion gear is engaged with the pinion gear such that the purifying part is capable of rotating vertically.

11. The robot purifier of claim 8, wherein the lower cover has a semispherical shape.

12. The robot purifier of claim 7, wherein the air discharge hole is located on a front surface of the purifying part, and air suction holes are located on a left surface or a right surface, or both of the left surface and the right surface of the purifying part, and
wherein the air suction holes are cover filters which are provided in the guide fan assembly, the air discharge hole is a discharge grill which is provided in the guide fan assembly, and the discharge grill is located on the front surface of the purifying part.

* * * * *